July 8, 1958 — E. G. JOHNSON ET AL — 2,842,692
DIRECT CURRENT MOTOR
Filed March 8, 1954 — 2 Sheets-Sheet 2
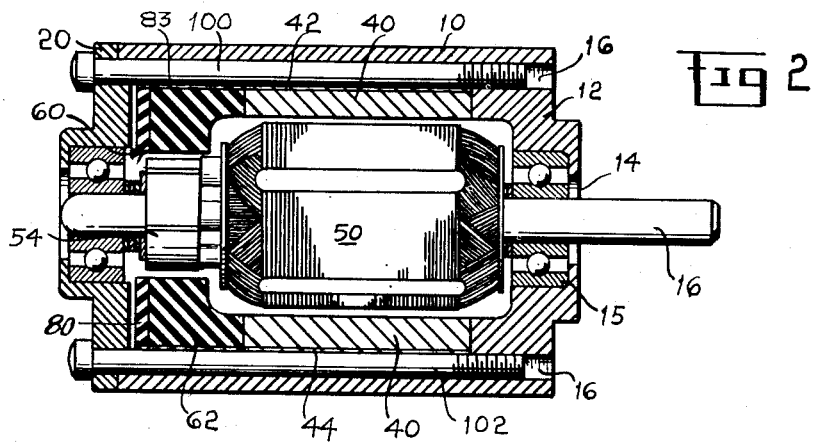
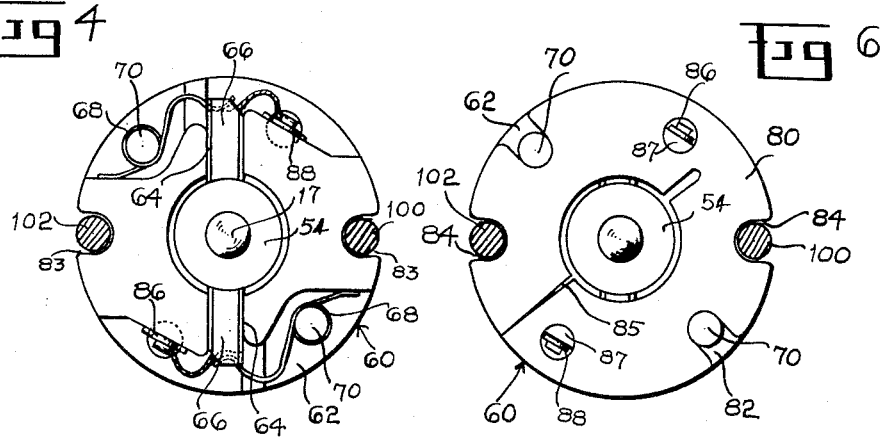
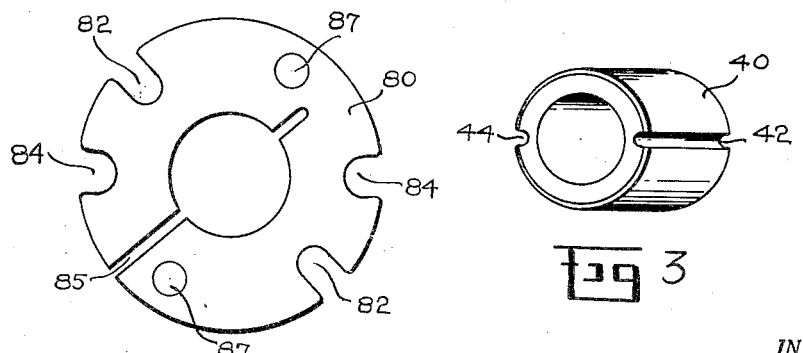
INVENTORS
Edward G. Johnson
Alfred M. Caton
BY
Their Attorneys

United States Patent Office 2,842,692
Patented July 8, 1958

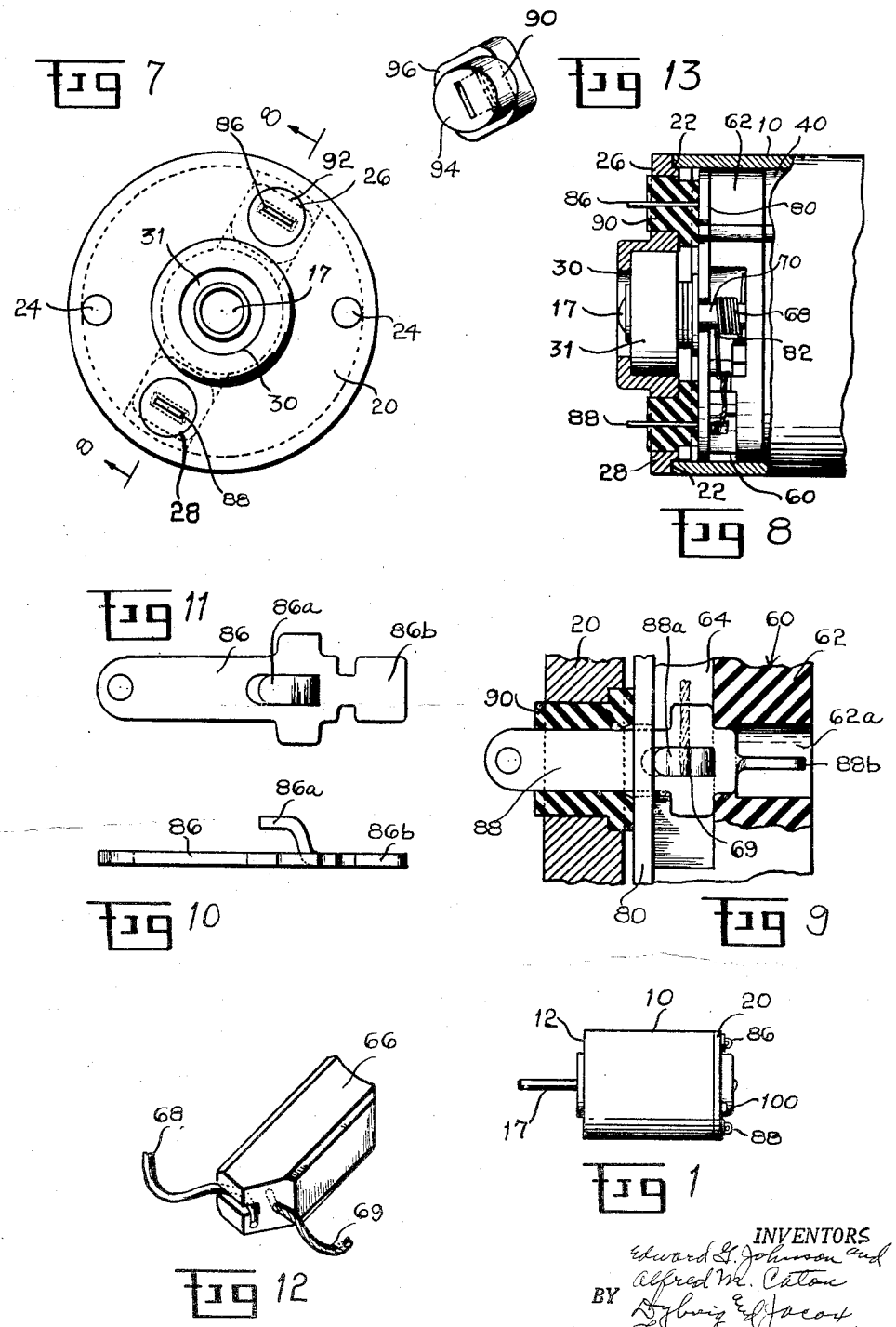

2,842,692
DIRECT CURRENT MOTOR

Edward G. Johnson and Alfred M. Caton, Dayton, Ohio, assignors to Globe Industries, Inc., Dayton, Ohio, a corporation of Ohio Application March 8, 1954, Serial No. 414,586

8 Claims. (Cl. 310—239)

This invention relates to electric motors and more particularly to the arrangement of the parts therein.

An object of this invention is to provide an electric motor of the permanent magnet type, wherein the magnet consists of an annular, cylindrical member having at least a pair of oppositely disposed pole areas wherein the portion of the ring in the vicinity of the pole areas is provided with grooves, one for each pole, extending parallel to the axis of rotation of the armature, the grooves being located in the periphery of the cylindrical member, so that the grooves form a restricted area tending to intensify the polarization of the stator at the restricted area.

Another object of this invention is to provide a brush gear or yoke assembly that is cushioned, the brush gear assembly being resiliently held in position so as to permit yielding movement of the brush gear assembly independently of its supports.

Another object of this invention is to provide a brush gear assembly wherein two terminals are provided for connecting into the circuit, one terminal being electrically connected to one brush and the other terminal being electrically connected to the other brush.

Another object of this invention is to provide a housing for an electric motor of the permanent magnet type wherein the housing is made from a non-ferromagnetic material and is so arranged that the material forming the magnets of the motor may be magnetized after the stator has been inserted into the housing, the housing being provided with indicia for indicating the relative polarity of both the terminals for supplying electricity to the armature and the polarity of the permanently magnetized poles, so that when the motor is connected into the circuit it will rotate in the proper direction.

Other objects and advantages reside in the construction of parts, the combination thereof and the mode of operation, as will become more apparent from the following description.

In the drawings,

Figure 1 is a plan view of the motor.

Figure 2 is a cross sectional view taken on a plane passing through the axis of rotation of the armature.

Figure 3 is a perspective view of the permanently magnetized stator, drawn on a smaller scale than the disclosure in Figure 2, but on a larger scale than the disclosure in Figure 1.

Figure 4 is an end elevational view of the brush gear or yoke assembly.

Figure 5 is a view of an insulating member.

Figure 6 is another end view of the brush gear or yoke assembly with the insulating member mounted in position.

Figure 7 is an end view of the motor as viewed from the right of Figure 1 or from the left of Figure 2.

Figure 8 is a fragmentary, cross sectional view of the motor, taken substantially on the line 8—8 of Figure 7.

Figure 9 is an enlarged, detail, fragmentary view of a portion of the brush gear assembly and a capping member for the housing.

Figure 10 is a side elevational view of one of the terminals.

Figure 11 is a top plan view thereof.

Figure 12 is a perspective view of a brush, showing a portion of the pig-tail mounted therein and a portion of the spring for biasing the brush towards the commutator.

Figure 13 is a resilient member that is mounted in the end frame through which the terminal extends.

Referring to the drawings, the reference character 10 indicates a cylindrical housing member of non-ferromagnetic material, such as brass, aluminum, plastic material or any other suitable material, having one end 12 closed. The end 12 is provided with an opening 14 having mounted therein a bearing 15 for the armature shaft 17. The end 12 is also provided with a pair of threaded apertures 16. The opposite end of the cylindrical member 10 is open. A capping or end frame member 20 is used in closing the cylindrical member. The capping member 20 is provided with a rabbet 22 in which the end of the cylindrical member 10 is mounted. The end frame member 20 is provided with a pair of apertures 24. In addition thereto, it is provided with a second pair of openings 26 and 28 and a centrally disposed opening 30 having a bearing 31 mounted therein. Cylindrical member 10 cooperates with capping member 20 to form an enclosure for an electric motor, parts of which will now be described.

A stator 40, in the shape of a hollow cylinder, is snugly seated in the closed end 12 of the cylindrical member 10. The hollow cylindrical member 40, forming the stator, is provided with a pair of grooves or passages 42 and 44. The grooves 42 and 44 extend parallel to the longitudinal axis of rotation of the armature shaft, as will appear more fully later.

When the stator 40 is manufactured, it is marked with a preferred axis, that is, the annular ring has a notation on it indicating the preferred axis or diameter corresponding to the direction of magnetization. The grooves 42 and 44 are cut so as to intersect the preferred axis. This indication of the preferred axis is made so that when the stator is magnetized, the poles will correspond to the preferred axis. Thus, the grooves overlie the two poles, that is, groove 42 overlies one pole and groove 44 overlies the other pole. This results in a restricted area underlying the grooves, which restricted area is positioned in the center of each of the magnetized poles.

The stator is made from any suitable magnetic material having the proper retentivity, for example, material sold under the trade name "Alnico" and produced by General Electric Company which is an alloy of Fe-Ni-Al-Co-Cu. The stator 40 is preferably provided with a precision finish, so that it is accurately positioned within the cylindrical member 10. The center of the cylindrical stator member 40 is concentric with the longitudinal axis of cylindrical member 10.

A laminated armature 50 is mounted upon the armature shaft 17 journalled in the bearings 15 and 31. The armature 50 is a wound laminated type armature provided with a commutator 54.

A brush gear or yoke assembly 60 is mounted near one end of the cylindrical member 10. In the particular device disclosed herein the brush gear or yoke assembly 60 is mounted near the open end of the cylindrical member 10. This brush gear assembly 60 includes a plastic member 62 having a pair of radially disposed slots 64 in which the brushes 66 are mounted for longitudinal sliding movement. The brushes 66 are biased towards the commutator by suitable springs 68. Pig-tails 69 are used to connect the brushes in an electric circuit. Member 62 is provided with a pair of bosses or studs 70, upon which the springs 68 are mounted. This member 62 is also provided with arcuate peripheral slots 83.

A disc of insulating material 80, forming a brush insulator, is provided with arcuate peripherally disposed slots 82 and 84. These slots 82 are diametrically disposed. So are the slots 84. The insulated disc 80 is also provided with a radially disposed slit 85. The material from which the disc 80 is made is slightly elastic, so that after the brushes have been mounted in position in member 62 and the springs assembled, the disc 80 is then inserted so as to engage the bosses 70. However, in order to get the disc 80 into position, it is necessary to compress the disc 80, so as to close the gap 85. The arcuate slots 82 engage the studs 70, so that the resiliency of the disc 80 holds this disc in position by an outward force exerted on the diametrically disposed studs 70.

A pair of terminals 86 and 88 project outwardly from the yoke or brush gear assembly 60. The terminal 86 is connected to the pig-tail 69 embedded in one of the brushes 66 and the terminal 88 is connected to pig-tail 69 embedded in the other brush 66. A clip or tongue 86a or 88a is used to clamp a pig-tail to the terminals 86 and 88. These terminals 86 and 88 project outwardly through the openings 26 and 28 in the end frame or end bell 20. The terminals 86 and 88 are, so to speak, rather loosely but fixedly mounted with respect to the yoke 60, so that movement of the terminals is only slightly reflected in movement in the yoke, and vice versa. This has been accomplished by bending ends 86b and 88b through an angle of about 90°, as clearly seen in Figure 9. Each of the bent ends 86b and 88b is seated in a suitable notch 62a in member 62. The contacts 86 and 88 project through holes 87 in the insulating disc 80.

In order to provide a cushion mounting for the two terminals 86 and 88, a pair of slotted rubber grommets or rubber plugs 90 and 92 are mounted in the openings 26 and 28 and fixedly seated therein, so that as the terminals 86 and 88 project through the slots in the grommets, the grommets provide a resilient support for the brush gear or yoke 60. The grommet or plug 90 may be red and the grommet or plug 92 may be black. Each of these grommets or plugs 90 and 92 is provided with a cylindrical portion 94 and an offset substantially cubicle portion 96 which cooperate to prevent rotation of the plug when mounted in position, as clearly seen from Figures 7 and 13.

The stator 40 is first inserted into the cylindrical member 10 having the slots 42 and 44 registering with the apertures 16 in the end of member 10. The armature is then inserted with one end of the shaft 17 projecting through the bearing in the aperture 14. After the armature has been inserted, the brush gear or yoke assembly is inserted with the brushes actuated radially, so as to engage the commutator segments 54. The yoke and brush assembly 60 is then actuated so that the marginal slots 82, 83 and 84 are aligned with the grooves 42 and 44, which are aligned with the apertures 16. The capping member 20 is then inserted into position with one of the terminals 86 projecting through the slot in the grommet in the aperture 26 and the other terminal 88 passing through the other grommet. As stated above, one of these grommets is red and the other is black, the red indicating the positive terminal and the black indicating the negative terminal.

Finally, a pair of bolts 100 and 102 are passed through the apertures 24 in member 20, through the slots in the margin of the yoke assembly 60, through the grooves or passages 42 and 44 and threaded into the apertures 16 in the end of the cylindrical member 10. The diameter of the bolts 100 and 102 is smaller than the dimensions of the grooves 42 and 44, the grooves 83 and the slots 84. Thus, the bolts do not come into contact with the stator 40 and the brush gear or yoke 60. The bolts are made from a non-magnetic material, preferably non-magnetic stainless steel.

After the parts have been assembled, the stator 40 is then magnetized, the north pole being selected so that the motor will rotate in the proper direction when the positive terminal is connected to a source of electrical energy and the negative terminal is grounded or connected to a return lead.

The brush gear or yoke assembly 60, together with member 80, is loosely positioned upon the commutator 54. The brushes 66 are spring urged against the commutator. The yoke assembly has a certain amount of clearance between the notches or recesses therein and the bolts 100 and 102, so that the yoke assembly has limited movement with respect to the bolts 100 and 102. Likewise, the two terminals 86 and 88, although fixedly attached by the portions 86b and 88b which are bent at right angles to the main body of the contacts 86 and 88 respectively, permit limited body of the brush gear or yoke assembly 60. Furthermore, the terminals 86 and 88 are mounted in the grommets 90, that, again, permits relative movement between the terminals and the end frame 26.

The use of this stator is not limited to the particular type of armature brush yoke and housing shown herein. Furthermore, the stator need not necessarily be made from the particular material described. Any suitable ferromagnetic material having the desired retentivity may be used. Furthermore, the brush yoke or brush gear is not limited in its use to the particular type of stator shown or the particular type of armature shown, in that this brush gear assembly may be used on any brush type of motor. The housing has been shown as a cylindrical member having a closed end, so as to form a substantially cup-shaped member. This housing need not necessarily be made in this particular manner. For example, both ends could be open or the opposite end could be open, or two cup-shaped members could be used having a seam somewhere between the ends of the housing. The particular stator shown and the particular brush yoke or brush gear could be used with some other type of housing or, for that matter, they could be used without a housing, within the purview of this invention.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. A brush gear or yoke assembly for use in an electric motor having a commutator, said brush assembly including a brush yoke encircling the commutator, said brush yoke having a plurality of cylindrical bosses integral therewith, a plurality of spring members, one for each of the bosses, each of said spring members encircling a boss, said yoke having a plurality of radially disposed grooves, brushes mounted in the grooves, a plurality of elongate terminals attached to the yoke, pig-tails for connecting the terminals to the brushes, said pig-tails being embedded in the brushes, said spring members biasing the brushes towards the commutator, a resilient and split insulating ring concentric with the brush yoke and having a plurality of apertures therein, there being one aperture for each terminal, the terminals extending through the apertures, the insulating ring also having a plurality of marginal grooves therein, there being one groove for each boss, the insulating ring being positioned on one side of the yoke and holding the brushes in position, the marginal grooves of said ring being biased outwardly against the bosses to thereby hold the ring in position.

2. An eletcric motor comprising a housing having an anti-friction bearing at one end thereof, a circular magnetic pole piece structure having a plurality of grooves therein slidably fitting within the housing, an armature having a commutator at one end thereof and a shaft journalled in the bearing, a brush yoke concentric with the pole piece structure and encircling the commutator, said yoke having a plurality of cylindrical bosses, a plurality of spring members, one encircling each cylindrical boss, a plurality of elongate terminals attached to the yoke, brushes attached to the terminals, there being one brush for each terminal, said brushes being engaged by the spring members, a split insulating ring concentric with the brush yoke and having a plurality of apertures therein, the insulating ring also having a plurality of grooves therein, there being one groove for each boss, said bosses being seated in said grooves, the distance from the center of the insulating ring to the grooves being slightly greater than the distance from the center of the yoke to the bosses, the split insulating ring thus being firmly attached to the bosses, the insulating ring forming a brush guide and a retainer for the springs encircling the bosses, the brush yoke being slidably positioned within the housing adjacent the pole piece structure, a housing end plate having a bearing therein, a plurality of resilient and insulating members extending through the end plate and mounted therein, the resilient members having a slightly greater length than the thickness of the end plate, each resilient member being provided with an aperture therein, the terminals of the brush yoke extending through the apertures of the resilient members mounted in the end plate, the resilient members resiliently retaining the brush yoke in position relative to the commutator and relative to the end plate, and a plurality of elongate stud bolts extending through the housing, the stud bolts being threadedly attached to the housing adjacent the bearing therein.

3. In a brush holder and connector assembly, comprising a support ring, a pair of connection terminals attached to the ring, a pair of cylindrical bosses integral with the ring adjacent each of the connection terminals, the ring having a radial groove therein between each terminal and its adjacent boss, current carrying brushes slidably mounted in the grooves, there being one brush for each groove, helical springs encircling said bosses and resiliently engaging the brushes adjacent thereto, flexible conductor means joining each terminal to the brush adjacent thereto, an insulating ring forming a brush guide and a spring retainer and having substantially the same diameter as the support ring, the insulating ring having a radial slot therein, the insulating ring being provided with a pair of recesses, the diameter of each recess being slightly larger than the diameter of the bosses, the recesses being disposed one from the other a slightly greater distance than the bosses are disposed one from the other, each of the bosses being positioned within one of the recesses, the split ring permitting a clamping action as the apertures encircle the bosses, the insulating ring being thus clamped to the support ring.

4. In an electric motor, a stator element, a rotor element, at least one of said elements being constructed to provide circumferentially arranged electromagnetic poles, a commutator operatively connected with said electromagnetic poles, means for rotatably supporting one of said elements, and a brush gear unit floatingly supported by said commutator through the brushes of said brush gear but restricted to limit its radial and angular movement by said last mentioned means, said brush gear unit having a plurality of cylindrical bosses integral therewith, a plurality of spring members, one for each of the bosses, said spring members biasing the brushes toward the commutator.

5. In an electric motor, a stator element, a rotor element, at least one of said elements being constructed to provide circumferentially arranged electromagnetic poles, a commutator operatively connected with said electromagnetic poles, means for rotatably supporting one of said elements, and a brush gear unit floatingly supported by said commutator through the brushes of said brush gear but restricted to limit its radial and angular movement by said last mentioned means, a plurality of elongated terminals attached to the brush gear unit, a resilient insulating ring concentric with the brush gear and having a plurality of apertures therein for receiving the terminals, said insulating ring having a radial slot, the slot being closed upon insertion into the housing so as to be biased against bosses on said brush gear.

6. In an electric motor, a stator element and a rotor element, one of said elements being constructed to provide circumferentially arranged electromagnetic poles, the other of said elements comprising a discrete cylindrical homogeneous member of Fe—Ni—Al—Co—Cu material being magnetized to provide at least a pair of oppositely disposed polar areas, said member having a portion substantially at the center of the polarized areas, which is of reduced cross-sectional configuration extending substantially axially along the length of the stator to cause an intensification of the polarization in the vicinity of the poles, to lessen the tendency towards demagnetization during operation and serving also to predetermine the position of a brush holder unit assembly.

7. A stator for use in an electric motor comprising a discrete cylindrical homogeneous member of $$Fe—Ni—Al—Co—Cu$$

material being magnetized to provide at least a pair of oppositely disposed polar areas, said member having a portion substantially at the center of the polarized areas, which is of reduced cross-sectional configuration extending substantially axially along the length of the stator to cause an intensification of the polarization in the vicinity of the poles, to lessen the tendency toward demagnetization during operation and serving also to predetermine the position of a brush holder unit assembly.

8. A stator for use in an electric motor comprising a discrete cylindrical homogeneous member of $$Fe—Ni—Al—Co—Cu$$

material being magnetized to provide at least a pair of oppositely disposed polar areas, said member having a plurality of grooves cut into a surface thereof, there being one groove for each polar area and extending substantially axially along the length of the stator to cause an intensification of the polarization in the vicinity of the poles, to lessen the tendency toward demagnetization during operation and serving also to predetermine the position of a brush holder unit assembly.

References Cited in the file of this patent

UNITED STATES PATENTS

| | | |
|---|---|---|
| 1,674,876 | Thompson | June 26, 1928 |
| 1,950,754 | Scofield | Mar. 13, 1934 |
| 1,975,174 | Scofield | Oct. 2, 1934 |
| 2,325,915 | Naul | Aug. 3, 1943 |
| 2,479,455 | Aronoff | Aug. 16, 1949 |
| 2,532,700 | Eurich | Dec. 5, 1950 |
| 2,663,810 | Stein | Dec. 22, 1953 |
| 2,683,828 | Staak | July 13, 1954 |
| 2,692,345 | Wahlberg | Oct. 19, 1954 |

FOREIGN PATENTS

| | | |
|---|---|---|
| 387,879 | Great Britain | Feb. 16, 1933 |
| 485,950 | France | Dec. 1, 1917 |